(12) United States Patent (10) Patent No.: US 12,612,964 B2

Tegeltija (45) Date of Patent: Apr. 28, 2026

(54) GEARED MOTOR INCLUDING AN ELECTRIC MOTOR AND A GEARBOX

(71) Applicant: SEW-EURODRIVE GMBH & CO. KG, Bruchsal (DE)

(72) Inventor: Miki Tegeltija, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/868,426

(22) PCT Filed: Apr. 25, 2023

(86) PCT No.: PCT/EP2023/060848

§ 371 (c)(1),
(2) Date: Nov. 22, 2024

(87) PCT Pub. No.: WO2023/227314

PCT Pub. Date: Nov. 30, 2023

(65) Prior Publication Data

US 2025/0341247 A1 Nov. 6, 2025

(30) Foreign Application Priority Data

May 24, 2022 (DE) .......................... 102022001828.4

(51) Int. Cl.
*F16H 57/023* (2012.01)
*F16H 57/02* (2012.01)
*F16H 57/033* (2012.01)

(52) U.S. Cl.
CPC ......... *F16H 57/023* (2013.01); *F16H 57/033* (2013.01); *F16H 2057/02034* (2013.01)

(58) Field of Classification Search
CPC ................. F16H 57/023; F16H 57/033; F16H 2057/02034
See application file for complete search history.

(56) References Cited

U.S. PATENT DOCUMENTS

| | | | | |
|---|---|---|---|---|
| 2,835,138 | A | * | 5/1958 | Hey ...................... F16H 57/021 74/421 R |
| 3,959,990 | A | * | 6/1976 | Golitz .................... H02K 7/116 464/83 |

(Continued)

FOREIGN PATENT DOCUMENTS

| | | |
|---|---|---|
| DE | 10332757 B4 | 7/2015 |
| DE | 102018000963 A1 | 8/2018 |

(Continued)

OTHER PUBLICATIONS

Trasnlation of DE 102019003545A1, obtained from fit database (Year: 2019).*

(Continued)

*Primary Examiner* — Thomas C Diaz
(74) *Attorney, Agent, or Firm* — Carter, DeLuca & Farrell LLP

(57) ABSTRACT

A geared motor includes an electric motor and a gearbox. The gearbox has a flange part which is fastened to a housing part of the gearbox by first screws, the flange part has a hollow cylindrical collar region, a connection part has a first hollow cylindrical collar region and a second hollow cylindrical collar region, the first collar region is arranged radially outside the second collar region, the first collar region is fitted onto the collar region of the flange part, and the connection part is connected to the electric motor by second screws.

20 Claims, 6 Drawing Sheets

(56) References Cited

U.S. PATENT DOCUMENTS

| | | | | |
|---|---|---|---|---|
| 6,227,073 | B1 * | 5/2001 | Vilain | F16H 57/033 |
| | | | | 403/14 |
| 2008/0197733 | A1 | 8/2008 | Oberle | |
| 2015/0349606 | A1 | 12/2015 | Filzen | |
| 2022/0368194 | A1 | 11/2022 | Tegeltija | |

FOREIGN PATENT DOCUMENTS

| | | | | | |
|---|---|---|---|---|---|
| DE | 102017125939 | A1 * | 9/2018 | ........... | B60K 7/0007 |
| DE | 102019003545 | A1 * | 12/2019 | ........... | F16D 1/0876 |
| DE | 102020003549 | A1 | 12/2020 | | |
| DE | 102020128970 | A1 | 5/2022 | | |
| EP | 3586040 | A1 | 1/2020 | | |
| JP | 2008-180318 | A | 8/2008 | | |

OTHER PUBLICATIONS

International Report on Patentability issued in corresponding International Application No. PCT/EP2023/060848, dated Nov. 7, 2024, pp. 1-9, English Translation.

International Search Report issued in corresponding International Application No. PCT/EP2023/060848 dated Jun. 21, 2023, pp. 1-3, English Translation.

* cited by examiner

A-A

GEARED MOTOR INCLUDING AN ELECTRIC MOTOR AND A GEARBOX

FIELD OF THE INVENTION

The present invention relates to a geared motor that includes an electric motor and a gearbox.

BACKGROUND INFORMATION

In certain conventional systems, in a geared motor, a gearbox is driven by an electric motor.

A geared motor is described in Japanese Patent Document No. 2008-180319.

A drive is described in German Patent Document No. 10 2018 000 963.

A geared motor which has a multi-stage gearbox is described in German Patent Document No. 10 2020 128 970.

A servomotor is described in German Patent Document No. 103 32 757.

A geared motor with an adapter part is described in German Patent Document No. 10 2020 003 549.

SUMMARY

Example embodiments of the present invention provide for ready assembly and/or maintenance of a geared motor.

According to example embodiments, in a geared motor that includes an electric motor and a gearbox, the gearbox has a flange part which is fastened to a housing part of the gearbox by first screws, and the flange part, e.g., on its side facing the electric motor, has a hollow cylindrical collar region. For example, the cylinder axis of the hollow cylindrical collar region is coaxially aligned with the axis of rotation of the rotor shaft of the electric motor. A connection part has a first hollow cylindrical collar region and a second hollow cylindrical collar region which is aligned coaxially, for example, with respect thereto. The first collar region is arranged radially outside the second collar region, and the first collar region is fitted onto the collar region of the flange part, e.g., is fitted onto while being in contact therewith. For example, the second collar region is arranged radially inside the collar region of the flange part. The connection part is connected to the electric motor, e.g., to a housing part or bearing flange of the electric motor, by second screws.

Thus, ready centering by axially directed insertion is achieved by the hollow cylindrical collar regions. This makes centering quick and readily possible when connecting the electric motor to the gearbox. The rotor shaft is also inserted a coupling part and thus connected for conjoint rotation with the input shaft, which is connected for conjoint rotation with the coupling part. Alternatively, however, the coupling part is also connectable to the rotor shaft first and, when plug connecting the motor to the gearbox, the coupling part is connectable to the input shaft. This thus provides for ready connecting during production or maintenance.

According to example embodiments, bayonet wings project radially and/or radially outwards on the second collar region. Thus, a quick connection is possible by a bayonet connection.

According to example embodiments, the flange part has a through-going recess, e.g., an axially through-going recess, into which at least two projections, which are spaced apart from each other in the circumferential direction, e.g., arranged at the same radial distance and, e.g., of the same shape as one another, project radially inwards, and the second collar region projects through the recess. Thus, a quick and ready bayonet connection is possible. This means that after axial insertion and overcoming the spring force generated by the spring element, only a rotation is required to connect the motor to the gearbox.

According to example embodiments, the largest radial distance of the bayonet wings is smaller than the largest clear radius of the recess, e.g., than half of the largest clear internal diameter of the recess, and larger than the smallest clear internal diameter of the recess in the circumferential angular region covered by the protrusions. Thus, the bayonet wings can be readily inserted and then fixed by rotation, in which the spring element generates an axially acting spring force, which causes a frictional force that results in secure fixing.

According to example embodiments, the region covered by the second collar region in the axial direction includes the region covered by the first collar region in the axial direction. Thus, the spring element is arrangeable in a protected manner between the two collar regions. It is radial inside and outside of respectively one collar region.

According to example embodiments, a spring element supported on the connection part, e.g., a spiral spring, presses on the flange part. Thus, the bayonet connection is secured by the spring element. This is because it presses in axial direction and thus generates a frictional force for the bayonet wings, which are thus secured in the circumferential direction.

According to example embodiments, the spring element is arranged radially inside the first collar region and radially inside the collar region of the flange part. Thus, the spring element is arrangeable in a protected manner.

According to example embodiments, the spring element is arranged radially outside the second collar region. Thus, the spring element is guided on the second collar region, e.g., if it is arranged as a spiral spring.

According to example embodiments, the region covered by the first collar region in the axial direction includes the region covered by the spring element in the axial direction. Thus, the spring element is radially surrounded by the first collar region and is thus particularly well protected.

According to example embodiments, the spring element is supported on axially directed protrusions of the connection part. For example, the protrusions are spaced apart from each other in the circumferential direction and/or the protrusions are arranged at the same radial distance. Thus, the protrusions can be arranged as a support surface.

According to example embodiments, the second screws, e.g., the screw heads of the second screws, are spaced apart from the spring element in the axial direction. Thus, the protrusions alone support the spring element and are thus formable in an improved manner. The screw heads thus do not interfere with the supporting of the spring element.

According to example embodiments, the second screws are arranged at the same radial distance as the protrusions. Thus, the configuration is as compact as possible.

According to example embodiments, the radial distance region covered by the second screws overlaps or encompasses the radial distance region covered by the protrusions. Thus, the configuration is as compact as possible.

According to example embodiments, the flange part has a square or rectangular radial outer circumference with rounded corners. Thus, the gearbox can be provided with a square flange and still be connectable to an electric motor which has a round flange.

According to example embodiments, the rotor shaft is inserted into an axial bore of a coupling element, the planar flattenings of which are aligned parallel to corresponding planar flattenings of the input shaft of the gearbox, and the respective flattenings of the input shaft are separated from the respective flattenings of the coupling element only by a plastic cap fitted onto the input shaft. Thus, a ready connection is possible.

According to example embodiments, the flange part has projecting, e.g., axially projecting, centering pins on its side facing away from the electric motor, the radial inner side or radial outer side of which centering pins is curved, e.g., as a partial region of a cylinder jacket surface. Thus, the centering pins do not have to be introduced into corresponding centering holes, but instead, by their curved surface regions, rest on a circle or, for example, cylinders, in which a degree of freedom is left in the circumferential direction for tolerance-related deviations.

According to example embodiments, the gearbox housing has convex centering surfaces against which the centering pins rest with their curved inner side or outer side. For example, the convex centering surfaces are located on the cylinder jacket surface. Thus, high-precision centering in the radial direction is possible, and a degree of freedom is left in the circumferential direction for tolerance-related deviations.

Further features and aspects of example embodiments of the present invention are explained in more detail below with reference to the appended schematic Figures.

DETAILED DESCRIPTION

Figure 1:
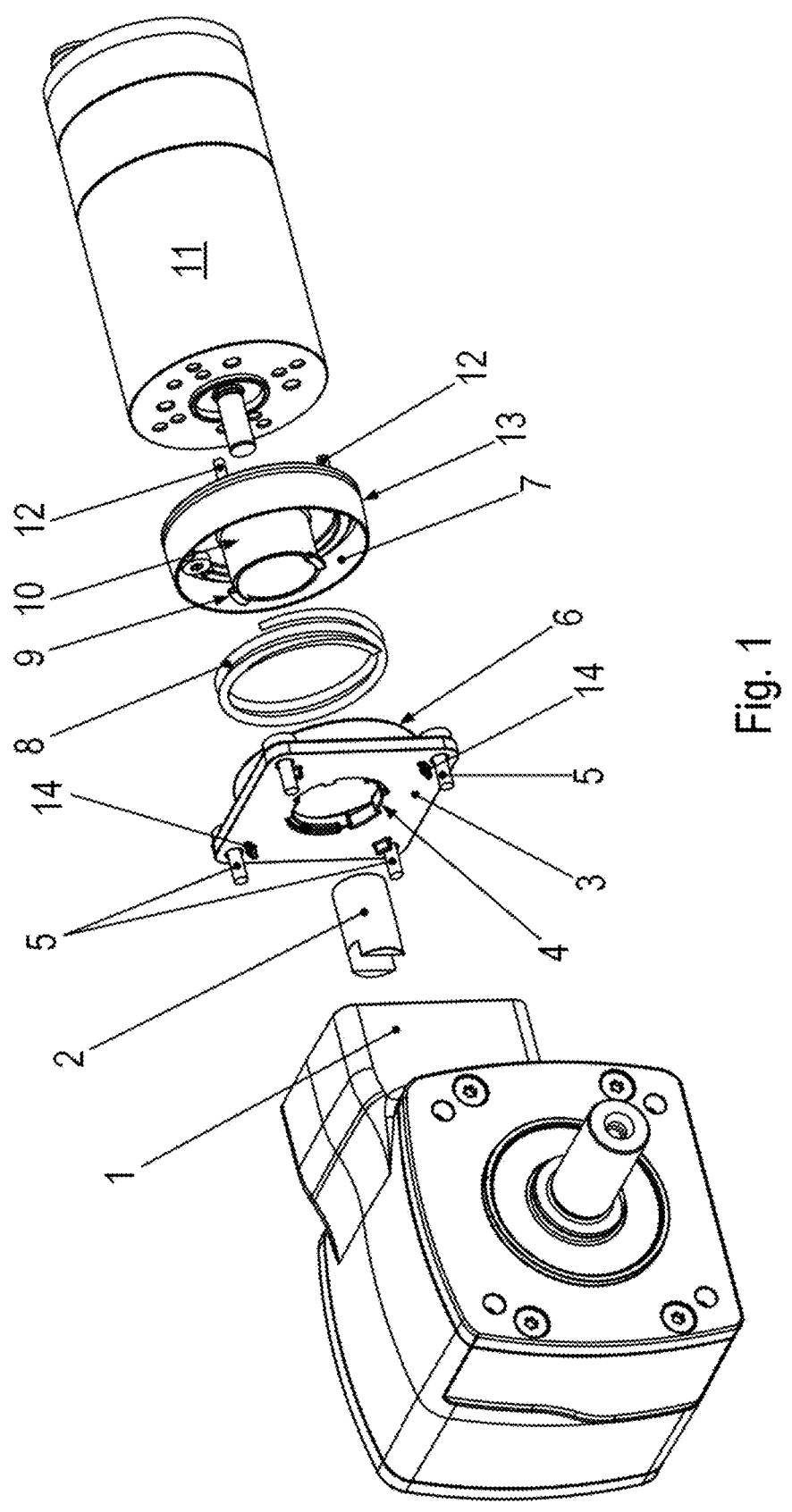
FIG. 1 is an exploded perspective view of a geared motor.
Figure 2:
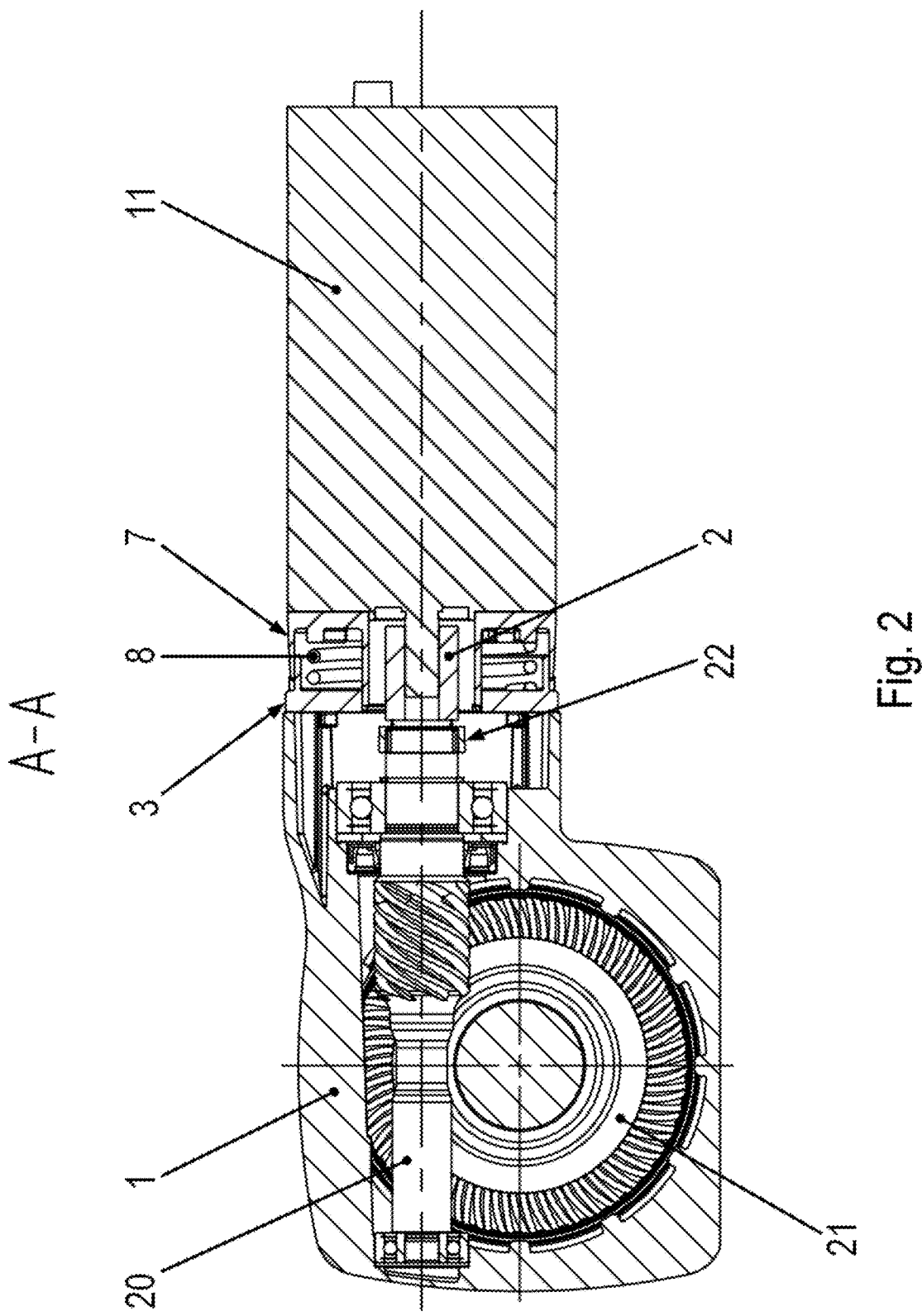
FIG. 2 is a longitudinal cross-sectional view through the geared motor.
Figure 3:
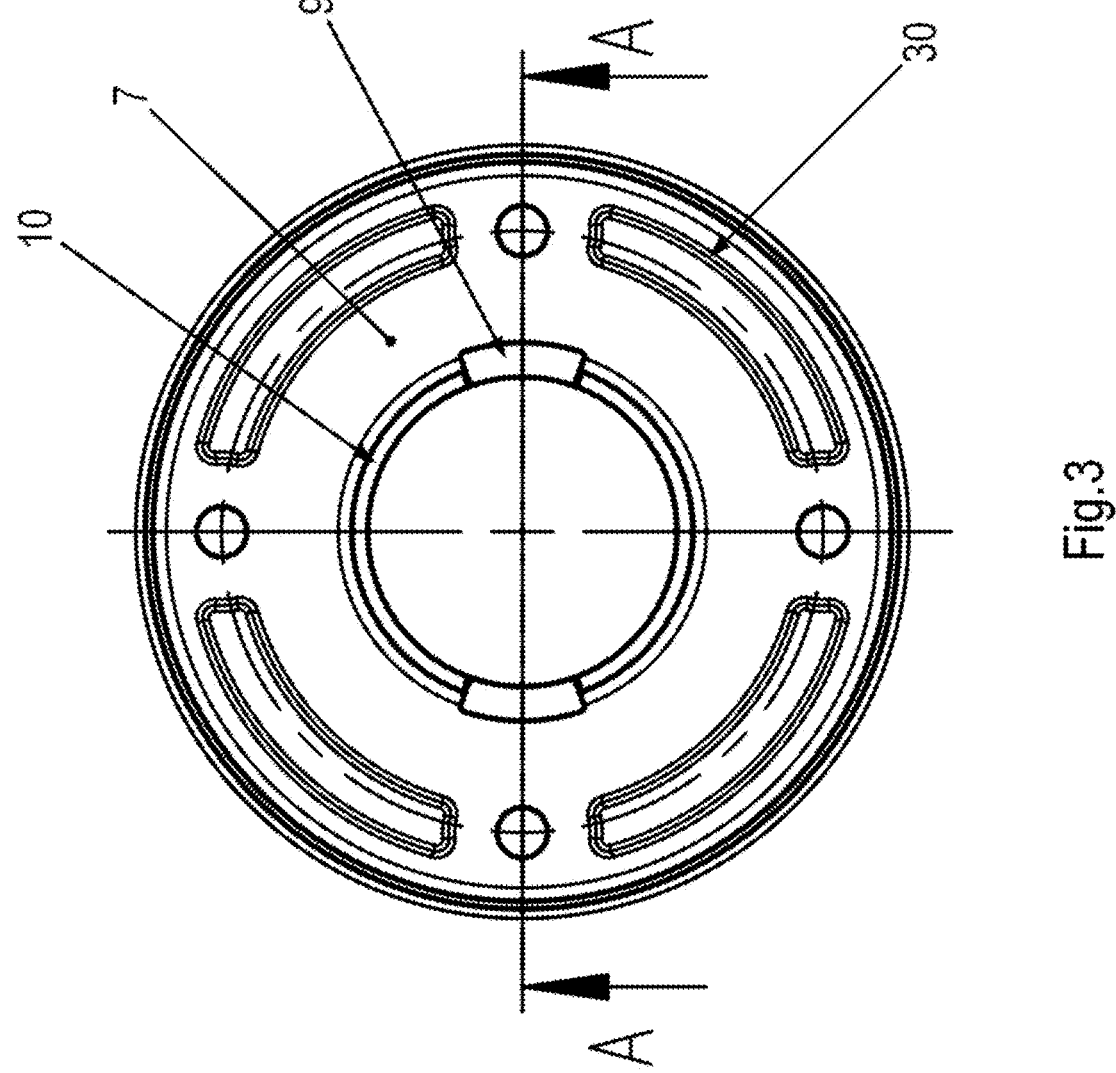
FIG. 3 is a top view of a connecting part 7 of a bayonet connection region of the motor.
Figure 4:
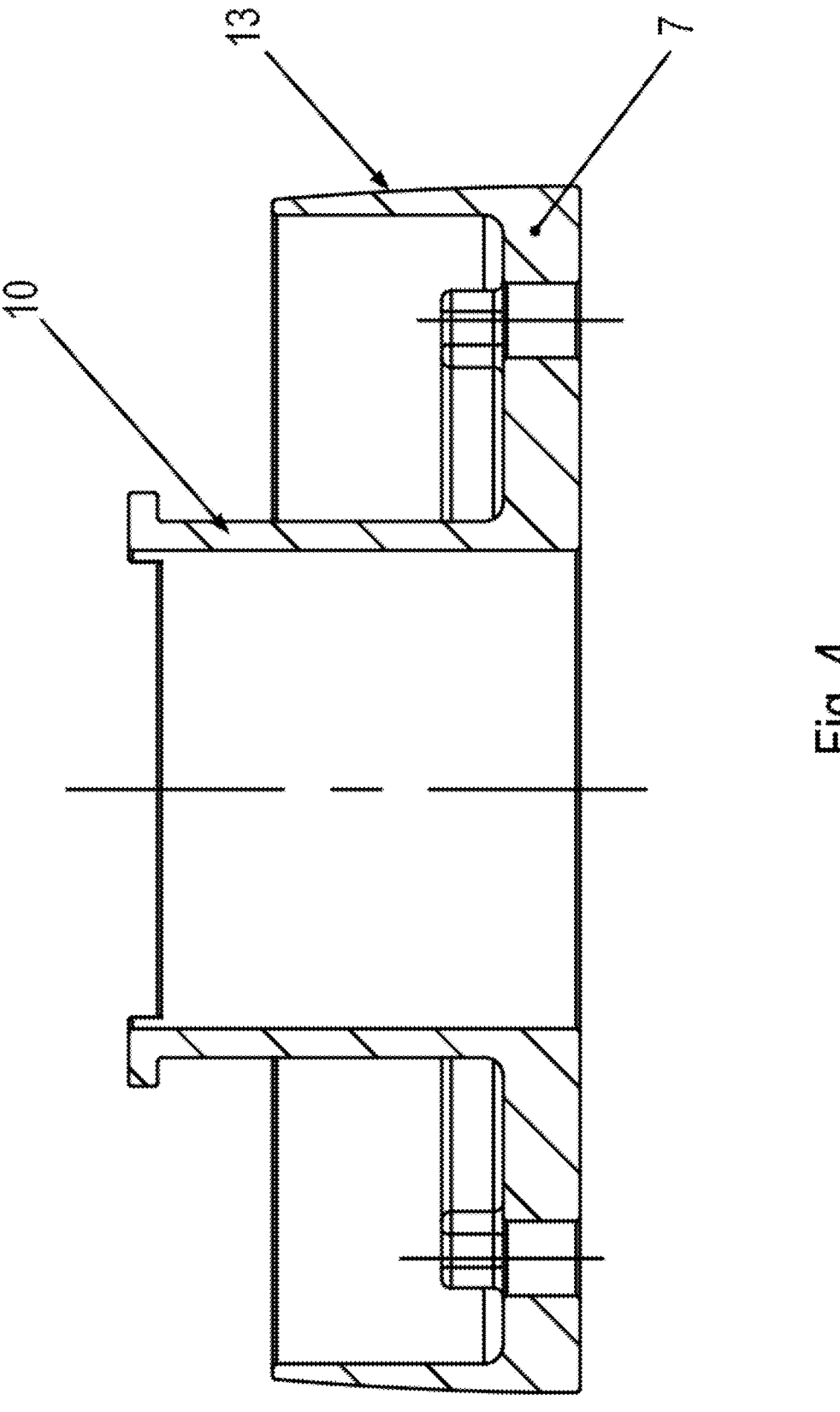
FIG. 4 is a cross-sectional view through the connection part 7.
Figure 5:
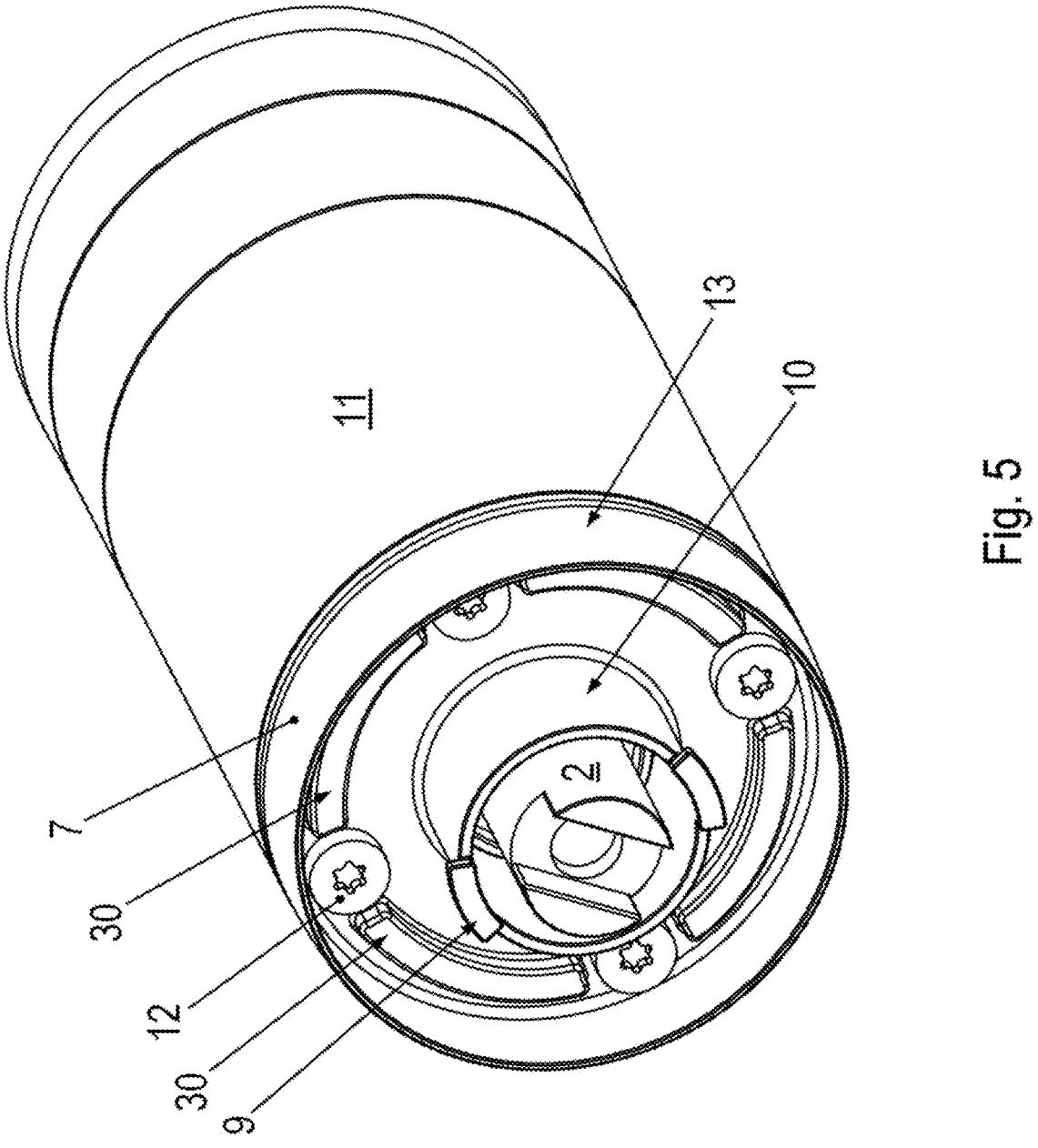
FIG. 5 is a perspective view of the motor part of the geared motor.

As schematically illustrated in the Figures, the geared motor has an electric motor 11 whose rotor shaft is connected for conjoint rotation to the input shaft 20 of the gearbox of the geared motor via a coupling part 2.

For this purpose, the rotor shaft is inserted into a bore of the coupling part 2 and connected in a force-fit manner and/or connected in a force-fit manner by a grub screw, which is screwed into a radially directed threaded bore of the coupling part 2.

The coupling part has two claw regions, the flat inner sides of which rest against the respective flattenings of the input shaft 20, e.g., so that the input shaft 20 is connected for conjoint rotation to the coupling part 2, and a plastic cap 22 is fitted onto the input shaft at the end face on the side of the input shaft facing the rotor shaft. The plastic cap 22 also covers the flattenings and is thus arranged between the input shaft 20 and the coupling part 2. The damping of torsional shocks in the region where the torque is introduced from the coupling part is provided.

The coupling part 2 together with the input shaft 20 projects through a recess of the gearbox housing 1.

A flange part 3 is connected to the gearbox housing 1 by first screws 5, the threaded region of which is screwed into respective axial bores of the gearbox housing 1 and the screw heads of which press the flange part 3 against the gearbox housing 1. The flange part 3 has a recess through which the rotating part formed by the coupling part 2 with the input shaft 20 projects.

The flange part 3 has a substantially square outer contour. The first screws 5 are arranged in the region of the corners of the square outer contour.

The flange part 3 has a hollow cylindrical collar region 6 which projects towards the electric motor 11.

On its side facing the gearbox, a connection part 7 has a radially inner, hollow cylindrical collar region 10 and a radially outer, hollow cylindrical collar region 13 arranged concentrically thereto, e.g., which has a larger diameter than the radially inner collar region 10.

The two collar regions 10 and 13 are connected to a perforated disk-like base of the connection part 7. For example, the connection part 7 thus has a pineapple disk-shaped recess between the two collar regions 10 and 13.

On the side of the base facing the gearbox, there are protrusions 30 spaced apart from each other in the circumferential direction, which serve as a support surface, e.g., a surface for supporting the spring element 8.

The protrusions 30 extend in the circumferential direction. For example, the protrusions 30 are expanded further in the circumferential direction than in the axial direction and in the radial direction. These directions are always related to the axis of rotation of the input shaft 20.

The spring element 8 supported on the protrusions 30 presses on the flange part 3. Thus, the flange part 3 and the protrusions 30 are pressed apart axially, thus securing the bayonet connection.

To achieve the form-fit connection of the bayonet connection, the connection part 7 has tongues on the outer edge of the radially inner collar region 10 which are bent at 90° and spaced apart from each other in the circumferential direction so that they project radially. The radially outer hollow cylindrical collar region 13 is fitted and/or slid onto the collar region formed on the flange part 3 and thus guided. The flange part 3, by its collar region, thus centers the connection part 7 and thus the electric motor 11.

In this manner, the connection part 7 is guided by the flange part 3, e.g., in the axial direction.

To create the bayonet connection, the bayonet wings 9, e.g., the bent tongues, are guided through the region covered by the projections 4 in the axial direction and then gripped behind by a rotation of the connection part 7.

On its side facing away from the electric motor 11, the flange part 3 has axially directed projecting centering pins 14, which rest against corresponding centering surfaces of the gearbox housing. The centering surfaces are, for example, all respectively a partial region of a jacket surface of a single cylinder.

The connection part 7 is connected to the electric motor by second screws 12 projecting axially through the connection part 7. For example, the second screws 12 are screwed into axially directed threaded holes of a housing part, e.g., a bearing flange, of the electric motor 11. The screw heads of the second screws 12 press the connection part 7 against the electric motor 11. However, the protrusions 30 project further in the axial direction than these screw heads of the second screws. The screw heads are thus at a distance from the spring element 8.

For example, four protrusions 30 are provided and the screw heads of the second screws 12 are arranged at the same radial distance as the protrusions 30. For example, the radial distance region covered by the screw heads overlaps with the radial distance region covered by the protrusions 30 or the radial distance region covered by the screw heads encompasses the radial distance region covered by the protrusions 30.

Figure 6:
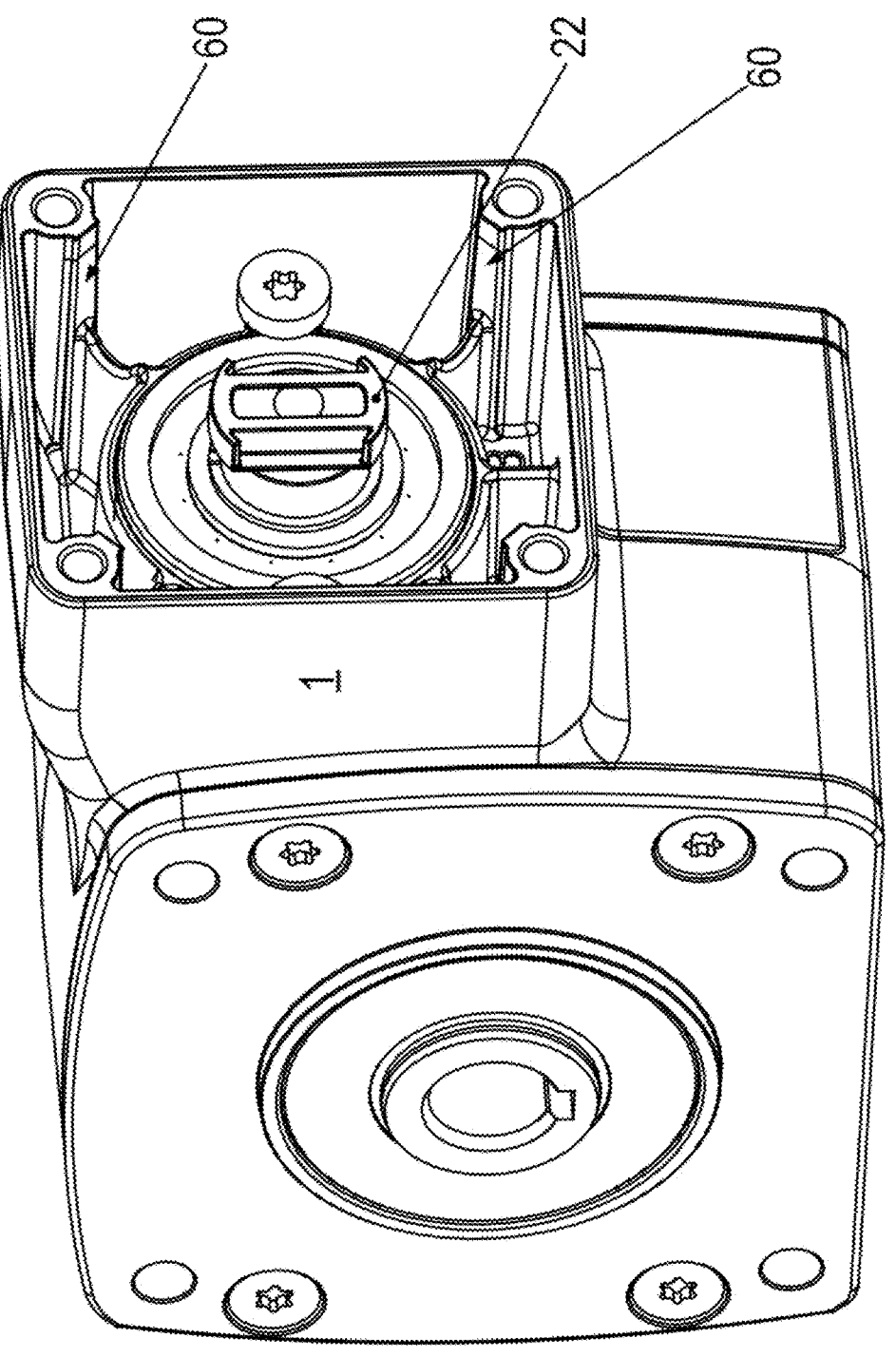
FIG. 6 is a perspective view of the input region of the gearbox of the geared motor.

As illustrated in FIG. 6, the plastic cap 22 is fitted onto to the input shaft 20.

As illustrated in FIG. 6, the gearbox housing 1 has convex centering surfaces 60 against which the centering pins 14 rest. The convex surface sections of the centering surfaces 60 are located together on a single imaginary cylinder jacket surface. This means that the centering pins 14 are not only limited radially outwards by the centering surfaces 60, but the connection part 7 is centered in relation to the gearbox housing 1.

In further example embodiments, the connection part 7 is not made of metal, but is made of plastic. This means that there is no ground connection between the gearbox and electric motor 11, so that the gearbox and electric motor 11 are galvanically isolated from each other. This is because the plastic cap 22 is arranged between the coupling part 2 and the input shaft 20, so that the rotating part of the geared motor also has galvanic isolation.

In a further configuration, wear of the plastic cap 22 is detectable by connecting a voltage source to the geared motor, e.g., by applying a first potential to a housing part, e.g., to the bearing flange, of the electric motor 11 and applying a second potential to the gearbox housing, e.g., to the flange part 3, and detecting a current. This is because when the plastic cap 22 is worn, an electrically conductive connection is created between the rotor shaft of the electric motor and the input shaft 20 of the gearbox.

In further example embodiments, other centering devices are used instead of the centering pins 14.

LIST OF REFERENCE NUMERALS

1 Gearbox housing
2 Coupling part
3 Flange part
4 Projection, e.g., projection directed radially inwards
5 First screw
6 Collar region of the flange part 3
7 Connection part
8 Spring element, e.g., spiral spring
9 Bayonet wing
10 Radially inner collar region of the connection part 7
11 Electric motor
12 Second screws
13 Radially outer collar region of the connection part 7
14 Centering pins with convex centering surface
20 Input shaft
21 Gear wheel, e.g., Spiroplan wheel
22 Plastic cap
30 Protrusion, e.g., support surface for spring element 8
60 Centering surface
The invention claimed is:

1. A geared motor, comprising:
a housing part;
an electric motor;
a gearbox including a flange part fastened to the housing part by first screws, the flange part including a hollow cylindrical collar region; and
a connection part having a first hollow cylindrical collar region and a second hollow cylindrical collar region, the first hollow cylindrical collar region arranged radi- ally outside the second hollow cylindrical collar region, the first hollow cylindrical collar region arranged on the hollow cylindrical collar region of the flange part, the connection part connected to the electric motor by second screws;
wherein bayonet wings project radially and/or radially outwardly on the second hollow cylindrical collar region.

2. The geared motor according to claim 1, wherein the hollow cylindrical collar region is arranged on a side of the flange part facing the electric motor, a cylinder axis of the hollow cylindrical collar region is coaxially aligned with an axis of rotation of a rotor shaft of the electric motor, the second hollow cylindrical collar region is arranged radially inside the collar region of the flange part and is aligned coaxially with respect to the first hollow cylindrical collar region, the first hollow cylindrical collar region being in contact with the hollow cylindrical collar region of the flange part, the connection part connected to a housing part and/or a bearing flange of the electric motor by the second screws.

3. A geared motor, comprising:
a housing part;
an electric motor;
a gearbox including a flange part fastened to the housing part by first screws, the flange part including a hollow cylindrical collar region; and
a connection part having a first hollow cylindrical collar region and a second hollow cylindrical collar region, the first hollow cylindrical collar region arranged radi- ally outside the second hollow cylindrical collar region, the first hollow cylindrical collar region arranged on the hollow cylindrical collar region of the flange part, the connection part connected to the electric motor by second screws;
wherein the flange part includes a through-going recess and/or an axially through-going recess into which at least two projections spaced apart from each other in a circumferential direction project radially inwardly, the second hollow cylindrical collar region projecting through the recess.

4. The geared motor according to claim 1, wherein a region covered by the second hollow cylindrical collar region in an axial direction includes a region covered by the first hollow cylindrical collar region in the axial direction.

5. The geared motor according to claim 1, wherein the flange part has a square or rectangular radial outer circum- ference with rounded corners.

6. The geared motor according to claim 1, wherein a rotor shaft is arranged in an axial bore of a coupling element having planar flattenings aligned parallel to corresponding planar flattenings of an input shaft of the gearbox, the planar flattenings of the input shaft being separated from the planar flattenings of the coupling element only by a plastic cap arranged on the input shaft.

7. The geared motor according to claim 1, wherein the flange part includes projecting centering pins on a side facing away from the electric motor, a radial inner side or a radial outer side of the centering pins being curved.

8. The geared motor according to claim 7, wherein the centering pins are arranged as axially projecting centering pins, and the radial inner side or the radial outer side of the centering pins is arranged as a partial region of a cylindrical jacket surface.

9. The geared motor according to claim 7, wherein a gearbox housing has convex centering surfaces against which the curved radial inner side or curved radial outer side of the centering pins rest.

10. The geared motor according to claim 9, wherein the convex centering surfaces are located against a cylindrical jacket surface of the centering pins.

11. The geared motor according to claim 3, wherein bayonet wings project radially and/or radially outwardly on the second hollow cylindrical collar region.

12. The geared motor according to claim 11, wherein the projections are arranged at a same radial distance and/or have a same shape as each other.

13. The geared motor according to claim 11, wherein bayonet wings project radially and/or radially outwardly on the second hollow cylindrical collar region, a largest radial distance of the bayonet wings is smaller than a largest clear radius of the recess and/or than half of the largest clear internal diameter of the recess, and larger than a smallest clear internal diameter of the recess in a circumferential angular region covered by the protrusions.

14. A geared motor, comprising:

a housing part;

an electric motor;

a gearbox including a flange part fastened to the housing part by first screws, the flange part including a hollow cylindrical collar region; and a connection part having a first hollow cylindrical collar region and a second hollow cylindrical collar region, the first hollow cylindrical collar region arranged radially outside the second hollow cylindrical collar region, the first hollow cylindrical collar region arranged on the hollow cylindrical collar region of the flange part, the connection part connected to the electric motor by second screws;

wherein a spring element supported on the connection part presses on the flange part.

15. The geared motor according to claim 14, wherein the spring element is arranged as a spiral spring.

16. The geared motor according to claim 14, wherein (a) the spring element is arranged radially inside the first hollow cylindrical collar region and radially inside the hollow cylindrical collar region of the flange part, (b) the spring element is arranged radially outside the second hollow cylindrical collar region, and/or (c) a region covered by the first hollow cylindrical collar region in an axial direction includes a region covered by the spring element in the axial direction.

17. The geared motor according to claim 14, wherein the spring element is supported on axially directed protrusions of the connection part.

18. The geared motor according to claim 17, wherein the protrusions are spaced apart from each other in a circumferential direction and/or the protrusions are arranged at a same radial distance.

19. The geared motor according to claim 14, wherein the second screws and/or screw heads of the second screws are spaced apart from the spring element in an axial direction.

20. The geared motor according to claim 17, wherein the second screws are arranged at a same radial distance as the protrusions, and/or a the radial distance region covered by the second screws overlaps or encompasses a radial distance region covered by the protrusions.

* * * * *